(12) United States Patent
Mizuta

(10) Patent No.: US 7,323,124 B2
(45) Date of Patent: Jan. 29, 2008

(54) OPTICAL DISC COVER LAYER FORMATION METHOD AND OPTICAL DISC COVER LAYER FORMATION DEVICE

(75) Inventor: Akira Mizuta, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 395 days.

(21) Appl. No.: 10/636,817

(22) Filed: Aug. 8, 2003

(65) Prior Publication Data
US 2004/0032035 A1    Feb. 19, 2004

(30) Foreign Application Priority Data
Aug. 14, 2002    (JP)    ............... 2002-236270

(51) Int. Cl.
*B29D 11/00*    (2006.01)
*B29D 17/00*    (2006.01)

(52) U.S. Cl. ............... 264/1.33; 264/1.38; 264/2.1; 425/810

(58) Field of Classification Search .............. 425/418, 425/810; 264/1.33, 1.36, 1.38, 1.7, 2.1
See application file for complete search history.

(56) References Cited

FOREIGN PATENT DOCUMENTS

| JP | 10-11820 A | 1/1998 |
|----|-----------|--------|
| JP | 2000-306275 A | 11/2000 |
| JP | 2001-351275 A | 10/2001 |
| JP | 2003-217194 | * 7/2003 |

* cited by examiner

*Primary Examiner*—Mathieu D. Vargot
(74) *Attorney, Agent, or Firm*—Sughrue Mion, Pllc.

(57) ABSTRACT

A liquid-form adhesive, which is a raw material of the cover layer, is supplied to a plate surface of the disc substrate, which has been set on a turntable, after which a dummy substrate is set on the disc substrate. The dummy substrate is positioned to be concentric with the disc substrate. A setting surface of the dummy substrate is disposed to face the plate surface. In this state, the disc substrate is rotated together with the dummy substrate by rotation of the turntable, and the adhesive is spread to an outer peripheral side of the disc substrate by centrifugal force. Thus, the adhesive fills a space between the plate surface and the setting surface, and is spin-coated on the plate surface. Irregularities in thickness of the applied adhesive are suppressed by the setting surface of the dummy substrate.

12 Claims, 5 Drawing Sheets

OPTICAL DISC COVER LAYER FORMATION METHOD AND OPTICAL DISC COVER LAYER FORMATION DEVICE

CROSS-REFERENCE TO RELATED APPLICATION

This application claims priority under 35 USC 119 from Japanese Patent Application No. 2002-236270, the disclosure of which is incorporated by reference herein.

BACKGROUND OF THE INVENTION

1. Field of the Invention

The present invention relates to an optical disc cover layer formation method and an optical disc cover layer formation device, and more specifically to an optical disc cover layer formation method and an optical disc cover layer formation device forming a cover layer by applying a photo-curing-type resin in liquid form to a disc substrate by a spin-coating method and irradiating light of a predetermined wavelength at the photo-curing-type resin for curing.

2. Description of the Related Art

As optical discs which replay or record information using laser light, CDs (compact disc), CD-Rs (compact disc-recordable), DVDs (digital versatile disc), DVD-Rs (digital versatile disc-recordable) and the like are becoming widespread. In recent years, optical discs have been proposed whose capacities are made larger in comparison to conventional CDs, DVDs and the like by using short-wavelength blue-violet laser lights for laser light and increasing numerical aperture (NA) of object lenses up to 0.85.

Because a focusing distance of the laser light is short with these large capacity optical discs, it is necessary to form a cover layer (laser light transmission layer), which protects an information recording layer provided at a top face (a plate surface) of a disc substrate, more thinly and with higher accuracy of thickness (for example, with a thickness dimension of around 0.1 mm, tolerance is of the order of ±3 μm).

Conventionally, such a cover layer has been formed by supplying a liquid-form resin, which is a source material for the cover layer, to a central portion vicinity of a disc substrate, applying the resin to the disc substrate by a spin-coating method, of rotating the disc substrate and spreading the resin by centrifugal force, and thereafter applying a predetermined curing process of heating the resin in the case of a heat curing-type resin, irradiating UV light in the case of an UV (ultraviolet) curing-type resin, or the like. However, with such a spin-coating method, differences in coating thickness may arise between a center side and a peripheral edge side of the disc surface, depending on a balance between viscosity (flowability) and spreading amounts (coating amounts) of the resin, which is spread in the diametric direction of the disc substrate by centrifugal force due to the spinning of the disc substrate, and the like. For example, there is a tendency for resin to be thicker at the center side of a disc surface to which the resin is supplied, becoming thinner toward the peripheral edge side in accordance with the spreading.

Accordingly, for the large capacity optical discs for which higher accuracy of thickness of the cover layer is required as mentioned above, many techniques for suppressing irregularities in resin thickness have been proposed. For example, a technique has been proposed which suppresses unevenness in thickness of a resin and raises accuracy of thickness of a cover layer by: setting a round plate portion of closing off means at a central hole of a disc substrate to close a central hole; while rotating the disc substrate at low speed, supplying liquid-form resin to a support shaft, which is standingly provided at an axial center portion of the round plate portion and rotates with the disc substrate, to distribute the resin uniformly on the round plate portion; and thereafter rotating the disc substrate at high speed to spin-coat the resin (see, for example, FIGS. 3 and 4 of Japanese Patent Application Laid-Open (JP-A) No. 2001-351275).

However, with the spin-coating method described in the patent reference mentioned above, the resin, which is uniformly applied to the round plate portion of the closing off means beforehand, is caused to flow without alteration from the round plate portion to the disc substrate by spin coating. Hence, irregularities in thickness are suppressed. However, this method is the same as convention in that the resin on the disc substrate, where the upper face is open, is spread only by centrifugal force. Consequently, as might be expected, there is a problem in that, in order to raise the accuracy of coating thickness, specification of conditions such as the viscosity of the resin, the rotation speed and rotation duration of the disc substrate and the like is complicated. Further, there is a problem in that production steps have to be strictly controlled.

SUMMARY OF THE INVENTION

In consideration of the circumstances described above, an object of the present invention is to provide an optical disc cover layer formation method and an optical disc cover layer formation capable of forming a cover layer for protecting a surface of a disc substrate to a high accuracy of thickness with a simple process.

An invention according to a first aspect for achieving the objective described above includes the steps of supplying liquid-form photo-curing-type resin to a plate surface of a disc substrate; setting a dummy substrate over the plate surface of the disc substrate, the dummy substrate being formed of light-transmissive material and including a facing surface which opposes the plate surface with a predetermined spacing; coating the photo-curing-type resin on the plate surface, by rotating the disc substrate with the dummy substrate about an axial line perpendicular to the plate surface for spreading the photo-curing-type resin between the plate surface and the facing surface; forming the cover layer, by irradiating light of a predetermined wavelength at the photo-curing-type resin through the dummy substrate for curing the photo-curing-type resin; and after the step of forming the cover layer, detaching the dummy substrate from the disc substrate.

In the invention according to the first aspect, the cover layer, which protects an information recording layer provided at the plate surface of the disc substrate or the like, is formed on the plate surface of the disc substrate. Accordingly, when the liquid-form photo-curing-type resin, which is a source material of the cover layer, is to be applied to (coated on) the plate surface of the disc substrate by a spin-coating method, the dummy substrate is set over the plate surface of the disc substrate after the photo-curing-type resin has been supplied to the plate surface of the disc substrate. When this dummy substrate is set over the plate surface of the disc substrate, the facing surface provided at the dummy substrate is disposed to face the plate surface with the predetermined spacing, and a gap is formed between the plate surface and the facing surface.

In this state, when the disc substrate is rotated, together with the dummy substrate, about the axial line which is perpendicular to the plate surface of the disc substrate, the photo-curing-type resin is spread in directions away from the axial line by centrifugal force, expands so as to fill the gap mentioned above, and is coated on the plate surface of the disc substrate. In this manner, the photo-curing-type resin which has been coated on the plate surface of the disc substrate is spread so as to have a predetermined film thickness which is the same as the predetermined spacing, and irregularities of thickness are suppressed.

Then, the light of the predetermined wavelength is irradiated to the photo-curing-type resin through the dummy substrate, which is formed of the light-transmissive material, such as a glass material, a transparent resin material or the like. The photo-curing-type resin is cured and the cover layer is formed, after which the dummy substrate is detached from the disc substrate. Thus, the cover layer can be formed with a high accuracy of thickness.

Because the photo-curing-type resin is coated so as to be formed by the dummy substrate in this manner, setting of conditions such as viscosity of the resin (coating solution), rotation speed of the disc substrate and the like in order to obtain a desired accuracy of thickness is simple in comparison to, for example, a spin-coating method which spreads a coating solution by centrifugal force alone, and control of production steps can be easy. Thus, the cover layer can be formed with a high accuracy of thickness with ease.

An invention according to a second aspect is the optical disc cover layer formation method according to the first aspect, in which the dummy substrate comprises a first spacing setting portion which, when the dummy substrate is set over the plate surface and the photo-curing-type resin is spread and applied (coated) to the plate surface, contacts the plate surface at the axial line side relative to a coat-region of the photo-curing-type resin on the plate surface and disposes the facing surface at a position opposing the plate surface with the predetermined spacing.

In the invention according to the second aspect, when the dummy substrate is set on the plate surface of the disc substrate to which the photo-curing-type resin has been supplied and rotated, the first spacing setting portion provided at the dummy substrate contacts the plate surface at the side of the axial line relative to the photo-curing-type resin application region (coat-region) on the plate surface, and the facing surface is disposed at the predetermined spacing with respect to the plate surface. Hence, the spacing between the plate surface and the facing surface is fixedly maintained, and the film thickness of the photo-curing-type resin is made uniform.

Because the first space setting portion directly contacts the plate surface of the disc substrate, film thickness accuracy of the photo-curing-type resin substantially depends only on dimensional accuracy of the first spacing setting portion. Consequently, effects caused by cumulative irregularities in accuracy of components are less likely to occur than in, for example, a case of setting the spacing indirectly via other components, or the like. By setting the height of the first spacing setting portion with high accuracy, film thickness accuracy of the photo-curing-type resin can be raised.

An invention according to a third aspect is the optical disc cover layer formation method according to the first aspect, in which the dummy substrate comprises a second spacing setting portion which, when the dummy substrate is set over the plate surface and the photo-curing-type resin is spread and applied (coated) to the plate surface, contacts a rotating member, which rotates the disc substrate, at an outer side relative to a coat-region of the photo-curing-type resin on the plate surface and disposes the facing surface at a position opposing the plate surface with the predetermined spacing.

In the invention according to the third aspect, when the dummy substrate is set on the plate surface of the disc substrate to which the photo-curing-type resin has been supplied and rotated, the second space setting portion provided at the dummy substrate contacts the rotating member for rotating the disc substrate at the outer side relative to the photo-curing-type resin application region on the plate surface, and the facing surface is disposed at the predetermined spacing with respect to the plate surface. Hence, the spacing between the plate surface and the facing surface is fixedly maintained, and the film thickness of the photo-curing-type resin is made uniform.

Because the second spacing setting portion contacts the rotating member and supports the dummy substrate at the outer side relative to the photo-curing-type resin application region of the disc substrate, surface oscillations and the like during rotation can be prevented, therefore, stability of the dummy substrate during rotation can be improved. Accordingly, film thickness-accuracy of the photo-curing-type resin is raised further.

An invention according to a fourth aspect is the optical disc cover layer formation method according to any one of the first to third aspects, further including the step of, before the step of setting the dummy substrate over the plate surface of the disc substrate, applying a parting agent (powder) to the facing surface of the dummy substrate beforehand.

In the invention of the fourth aspect, the parting agent such as silicone or the like is applied to the facing surface of the dummy substrate in advance. Consequently, when the dummy substrate is to be detached from the disc substrate, releasability from the cover layer becomes better, and deformations of the cover layer and the like can be avoided.

An invention according to a fifth aspect is the optical disc cover layer formation method according to any one of the first to fourth aspects, in which the dummy substrate is formed of a glass material.

Because the dummy substrate is formed of a glass material in the invention of the fifth aspect, a dummy substrate at which dimensional accuracy and planarity of the facing surface are higher and with excellent resistance to deformation can be fabricated simply and cheaply.

In the invention of a sixth aspect according to the second aspect, the first spacing setting portion is an extending portion, which is provided at a central portion of the dummy substrate, extending toward the plate surface in a state in which the dummy substrate is set over the plate surface.

In the invention of a seventh aspect according to the sixth aspect, the extending portion comprises a small diameter portion positioned in a tip end of the extending portion and a large diameter portion positioned in a base end of the extending portion, to have a stepped configuration, and the small diameter portion is inserted into a center hole of the disc substrate and the large diameter portion abuts on the plate surface of the disc substrate in a state in which the dummy substrate is set over the plate surface.

In the invention of an eighth aspect according to the sixth aspect, the extending portion abuts on a rotating member which rotates the disc substrate in a state in which the dummy substrate is set over the plate surface.

In the invention of a ninth aspect according to the third aspect, the second spacing setting portion is a flange formed at an outer peripheral face of the dummy substrate.

In the invention of a tenth aspect according to the ninth aspect, the flange abuts on an extending member, which is formed at an outer peripheral face of the rotating member, extending upwardly.

In the invention of an eleventh aspect according to the ninth aspect, the dummy substrate comprises a first spacing setting portion which, when the dummy substrate is set over the plate surface and the photo-curing-type resin is spread and coated on the plate surface, contacts the plate surface at the axial line side relative to a coat-region of the photo-curing-type resin on the plate surface and disposes the facing surface at a position opposing the plate surface with the predetermined spacing, and a second spacing setting portion which, when the dummy substrate is set over the plate surface and the photo-curing-type resin is spread and coated on the plate surface, contacts a rotating member, which rotates the disc substrate, at an outer side relative to the coat-region of the photo-curing-type resin on the plate surface and disposes the facing surface at the position opposing the plate surface with the predetermined spacing.

A twelfth aspect of the present invention is an optical disc cover layer formation device comprising: a rotating member, on which a disc substrate is mounted, for rotating the disc substrate; and a dummy substrate, which is set over the disc substrate, includes a facing surface which opposes a plate surface of the disc substrate with a predetermined spacing, and is formed of light-transmissive material, wherein the device coats a photo-curing-type resin on the plate surface to spread the photo-curing-type resin between the plate surface and the facing surface by supplying liquid-form photo-curing-type resin for forming a cover layer to the plate surface of the disc substrate, and rotating the disc substrate with the dummy substrate about an axial line perpendicular to the plate surface by the rotating member.

In the invention of a thirteenth aspect according to the twelfth aspect, the dummy substrate comprises a first spacing setting portion which, when the dummy substrate is set over the plate surface and the photo-curing-type resin is spread and coated on the plate surface, contacts the plate surface at the axial line side relative to a coat-region of the photo-curing-type resin on the plate surface and disposes the facing surface at a position opposing the plate surface with the predetermined spacing.

In the invention of a fourteenth aspect according to the twelfth aspect, the dummy substrate comprises a second spacing setting portion which, when the dummy substrate is set over the plate surface and the photo-curing-type resin is spread and coated on the plate surface, contacts the rotating member at an outer side relative to a coat-region of the photo-curing-type resin on the plate surface and disposes the facing surface at a position opposing the plate surface with the predetermined spacing.

In the invention of a fifteenth aspect according to the thirteenth aspect, the first spacing setting portion is an extending portion, which is provided at a central portion of the dummy substrate, extending toward the plate surface in a state in which the dummy substrate is set over the plate surface, the extending portion comprising a small diameter portion positioned in a tip end of the extending portion and a large diameter portion positioned in a base end of the extending portion, to have a stepped configuration, and the small diameter portion is inserted into a center hole of the disc substrate and the large diameter portion abuts on the plate surface of the disc substrate in a state in which the dummy substrate is set over the plate surface.

In the invention of a sixteenth aspect according to the fourteenth aspect, the second spacing setting portion is a flange formed at an outer peripheral face of the dummy substrate, and the flange abuts on an extending member, which is formed at an outer peripheral face of the rotating member, extending upwardly.

DETAILED DESCRIPTION OF THE INVENTION

Herebelow, optical discs and production methods thereof relating to embodiments of the present invention will be described with reference to the drawings.

First Embodiment

Figure 1:
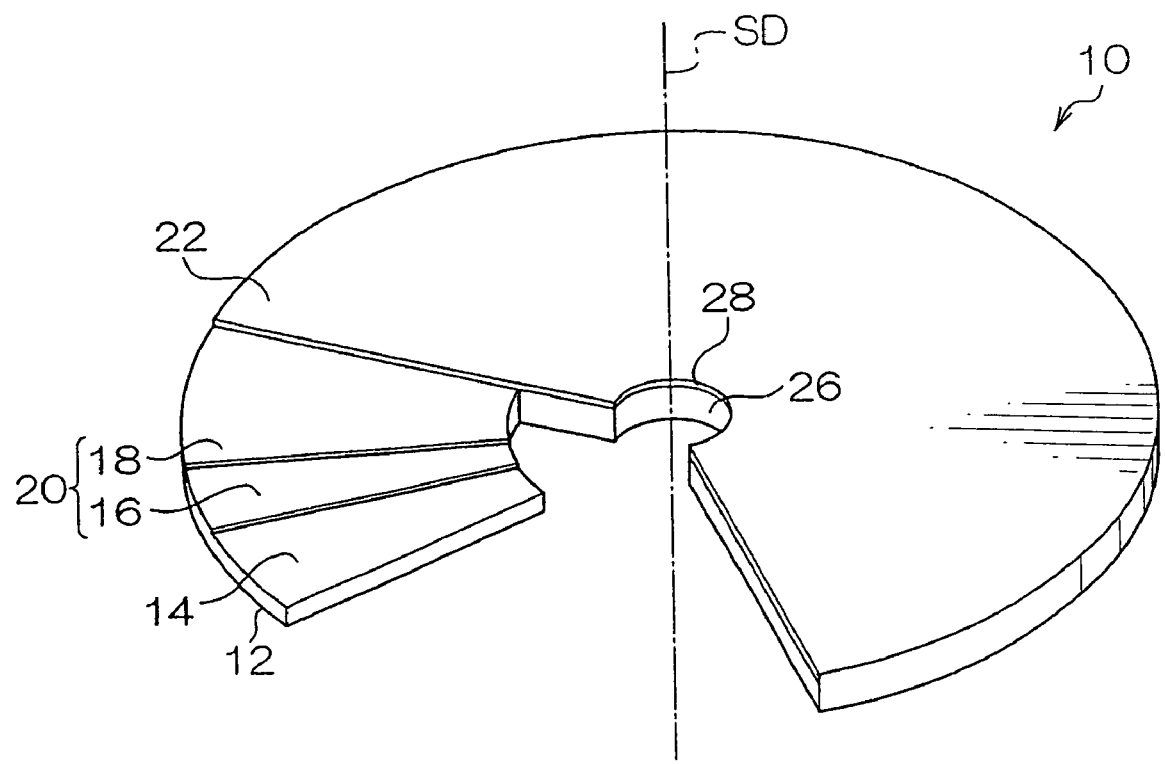
FIG. 1 is a partially cut away perspective view showing structure of an optical disc relating to an embodiment of the present invention.

FIG. 1 shows an optical disc relating to the present embodiment. This optical disc 10 is a disc capable of recording information at a higher density than conventional optical discs such as DVD-Rs and the like. For example, in comparison to a conventional optical disc, a shorter wavelength blue-violet laser light is used as laser light for recording and playback, and the numerical aperture NA of an object lens is increased up to 0.85. Thus, a single-side recording capacity for the optical disc 10 with a diameter of 12 cm can be raised to around 25 gigabytes.

The optical disc 10 is provided with a disc substrate 12, which is formed in a circular disc shape as shown in the drawing. The disc substrate 12 is a disc formed by molding, with a resin such as PC (polycarbonate) or the like being a material thereof. A surface of one side of the disc substrate 12 serves as a recording surface 14. A light reflection layer 16 and a light absorption layer 18 are laminated in this order at the recording surface 14. An information recording layer 20 is structured by the light reflection layer 16 and the light absorption layer 18.

A transparent cover layer 22, which covers and protects the information recording layer 20, is further provided on the disc substrate 12. This cover layer 22 is a layer which is formed by curing an ultraviolet rays-curing-type adhesive, and is described in detail later.

A circular center hole 26 is penetratingly formed at a central portion of the disc substrate 12, concentrically with an axial center SD which is a rotation center of the optical disc 10. A circular opening portion 28 is formed at a central portion of the cover layer 22. The opening portion 28 has substantially the same internal diameter as the center hole 26, with the axial center SD as the center thereof.

Figure 2:
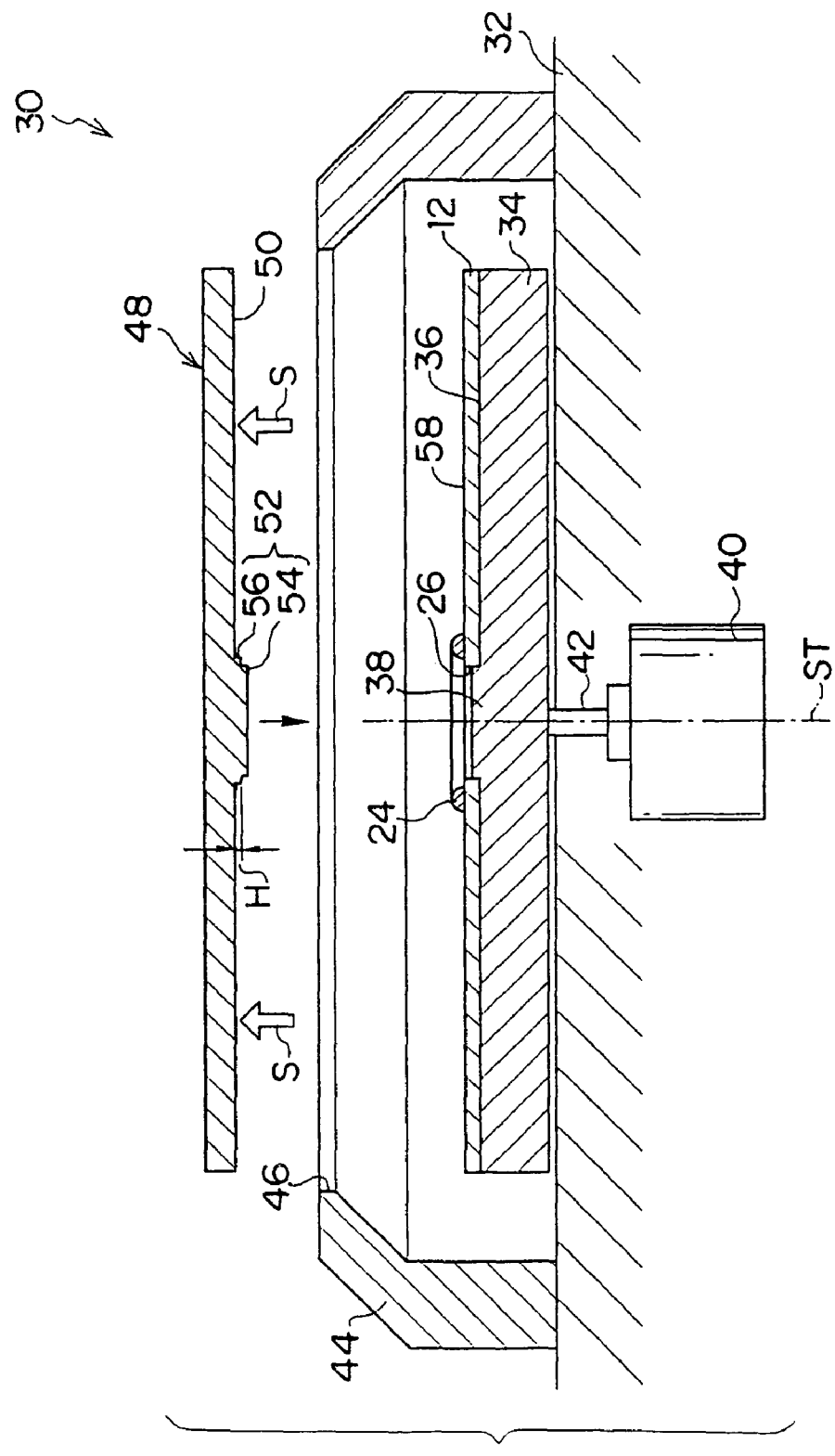
FIG. 2 shows general structure of apparatus of an adhesive coating device relating to a first embodiment of the present invention, and is a sectional elevational view of a state in which a disc substrate has been set on a turntable.
Figure 3:
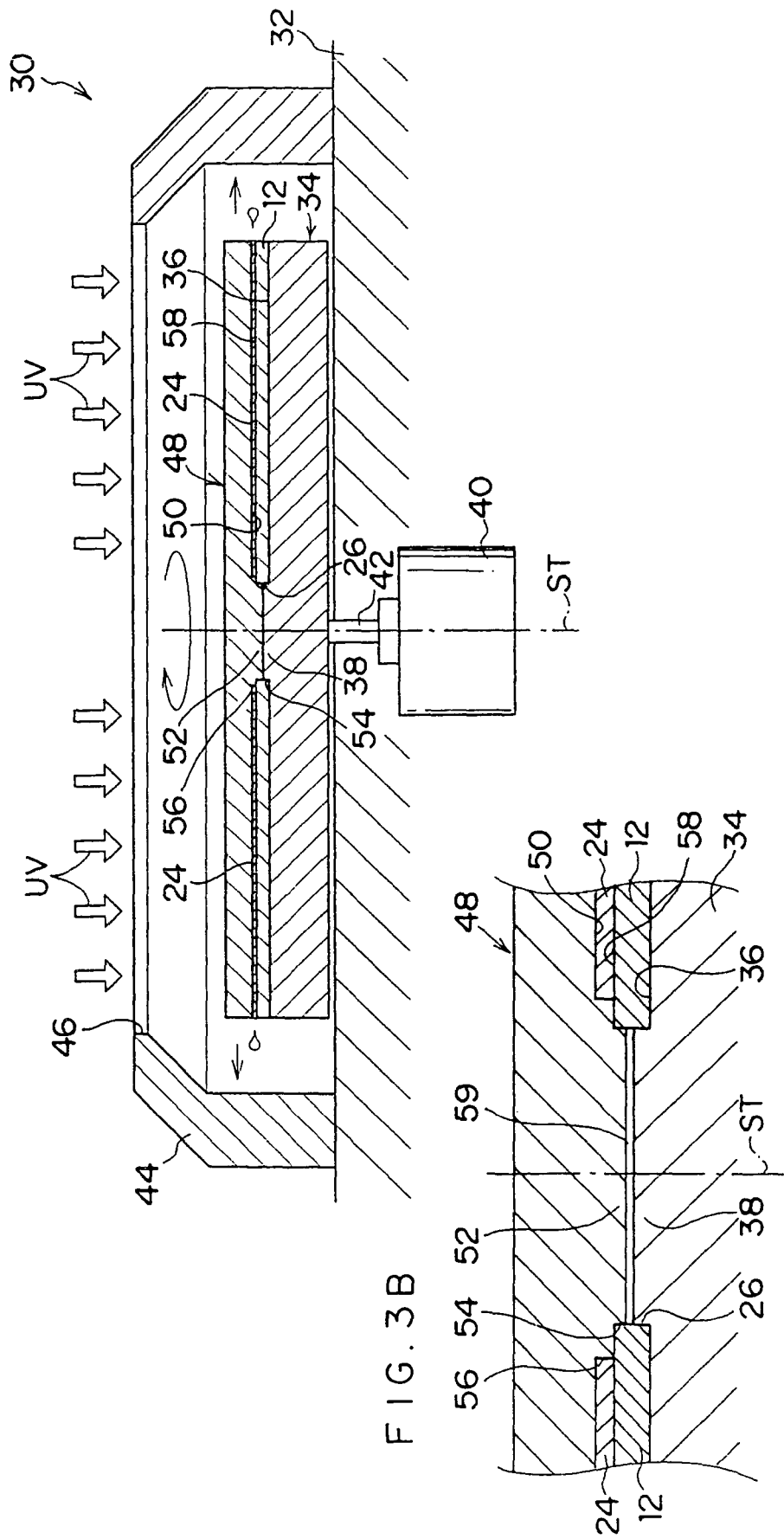
FIG. 3A shows general structure of apparatus of the adhesive coating device relating to the first embodiment of the present invention, and is a sectional elevational view of a state in which a dummy substrate is set on the disc substrate and an adhesive is spin-coated on the disc substrate.
FIG. 3B shows general structure of apparatus of the adhesive coating device relating to the first embodiment of the present invention, and is an enlarged view of a vicinity of a center hole of the disc substrate in FIG. 3A.
Figure 4:
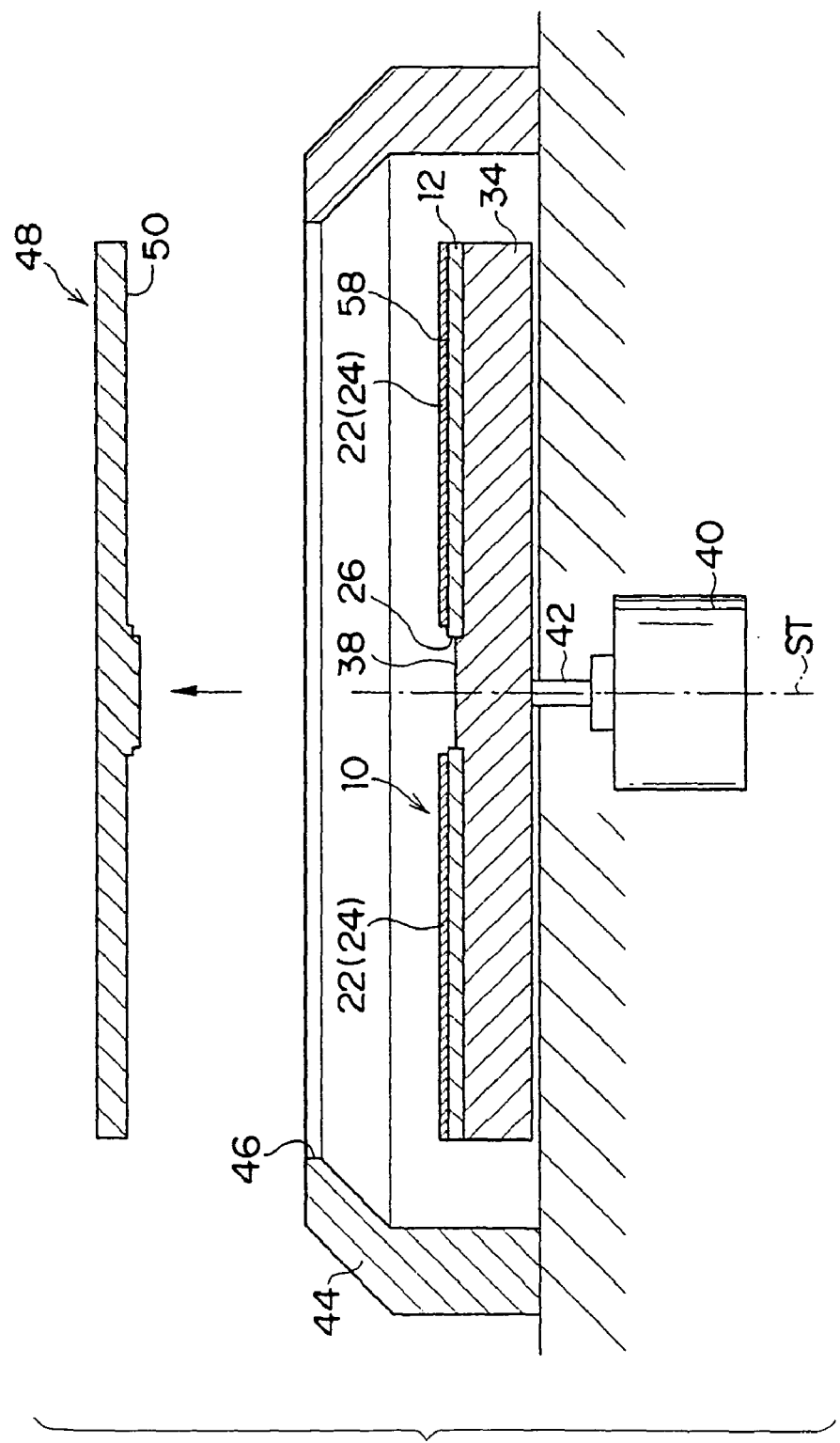
FIG. 4 shows general structure of apparatus of the adhesive coating device relating to the first embodiment of the present invention, and is a sectional elevational view of a state in which the dummy substrate has been removed from the disc substrate on which the adhesive has been spin-coated.

FIGS. 2 to 4 show general structure of an adhesive application (coating) device (spin coater) which is used in a production process of the optical disc relating to the first embodiment. Structure of this device will be described below.

As shown in the drawings, a turntable 34, which is set to the same diameter as the disc substrate 12, is provided in a thick circular plate shape on a base 32 of an adhesive coating device 30. An upper surface of this turntable 34 serves as a placing surface 36, at which the disc substrate 12 is placed. At a central portion of the placing surface 36, a circular column form boss 38 is formed to be concentric with an axial center ST of the turntable 34. An external diameter of the boss 38 is slightly smaller than the internal diameter of the center hole 26 of the disc substrate 12, and a height of the boss 38 is less than a thickness dimension of the disc substrate 12. When the disc substrate 12 is placed on the placing surface 36, the boss 38 enters into the center hole 26, and the disc substrate 12 is positioned to be concentric with the turntable 34.

Annular suction grooves (not shown) are respectively formed along peripheral directions about the axial center ST in upper faces of the placing surface 36 and the boss 38. These suction grooves are connected with a vacuum generation device (not shown) such as a vacuum pump or the like, via communication channels (not shown) which are provided in the turntable 34. Thus, when negative pressure is provided to the suction grooves from the vacuum generation device, the disc substrate 12 which has been placed on the placing surface 36 as shown in the drawings is fixed by suction on the turntable 34.

A stepping motor 40 is provided in the base 32. A rotation shaft 42 of the stepping motor 40 is coupled with a central portion of a lower face of the turntable 34. Thus, the turntable 34 is rotated about the axial center ST by the stepping motor 40. The rotation shaft 42 of the stepping motor 40 may be coupled with the turntable 34 via a torque transmission mechanism, a speed reducing mechanism or the like.

A turntable cover 44 is fixed on the base 32. The turntable cover 44 is formed by a wall body which is formed in an annular shape so as to surround the outer periphery of the turntable 34. A height dimension of the turntable cover 44 is significantly greater than a thickness dimension of the turntable 34. A circular aperture 46 is formed at an upper face portion of the turntable cover 44. The aperture 46 has a larger diameter than the turntable 34 (and the disc substrate 12).

The adhesive coating device 30 of the present embodiment is further provided with a dummy substrate 48, which is set on the turntable 34 so as to be superposed with the disc substrate 12.

The dummy substrate 48 is formed of a glass material having optical transmissivity. The dummy substrate 48 has a circular disc form which is thinner than the turntable 34 and whose external diameter is the same as the diameter of the turntable 34. A setting surface 50 of the dummy substrate 48, which faces to the disc substrate 12 side in the set state, is machined (finished) to a high degree of planarity.

A circular column form stepped boss 52 is formed at a central portion of this setting surface 50, coaxially with the axial center of the dummy substrate 48. A distal end side of the stepped boss 52 serves as a small diameter portion 54, whose diameter is slightly smaller than the internal diameter of the center hole 26 of the disc substrate 12. A proximal end side of the stepped boss 52 serves as a large diameter portion 56, which has a larger diameter than the small diameter portion 54. The large diameter portion 56 is precisely machined such that a height dimension H thereof, shown in FIG. 2, has high dimensional accuracy. In the present embodiment, H is set to 0.1 mm.

Next, an adhesive application process and operation of the optical disc 10 relating to the present embodiment will be described.

First, the disc substrate 12 is set on the turntable 34 of the adhesive coating device 30 with the side of the face at which the information recording layer 20 is formed (the side of a plate surface 58) facing upward. For this setting, a suction device (not shown) which is provided with a suction pad at a distal end of a moveable arm is utilized. The disc substrate 12 is lifted up by a negative pressure suction force of this suction pad, and is placed on the placing surface 36 of the turntable 34 by movement of the moveable arm. Hence, the disc substrate 12 is fixed by suction on the turntable 34, by negative pressure applied to the aforementioned suction groove of the placing surface 36.

Next, as shown in FIG. 2, a liquid-form Ultraviolat rays-curing-type adhesive (photo-curing-type resin) 24, which is a source material for the cover layer 22, is supplied to the plate surface 58 of the disc substrate 12 that has been set on the turntable 34 by a nozzle-form dispenser (not shown). A liquid-form Ultraviolat rays-curing-type adhesive such as "SD-640" or "SD-347" produced by Dainippon Ink and Chemicals, Incorporated, "3077" produced by Three Bond Co., Ltd., or the like can be used as this adhesive 24.

At the time of supply of this adhesive, a position of the dispenser is adjusted so as to be positioned a predetermined distance toward an outer peripheral side from the center hole 26. The adhesive 24 is dripped from the dispenser in predetermined amounts while the turntable 34 rotates at low speed. Thus, the adhesive 24 dripped from the dispenser is applied to the plate surface 58 in a ring pattern at the predetermined distance to the outer peripheral side relative to the center hole 26. Note that this adhesive supply could be carried out without rotating the turntable 34, by dripping the adhesive 24 while the dispenser is moved in the peripheral direction.

After the adhesive supply, the dummy substrate 48 is set over the plate surface 58 of the disc substrate 12. Here, a parting agent such as silicone or the like has been applied to the whole of the setting surface 50 of the dummy substrate 48 beforehand (the arrow S in FIG. 2). The suction device mentioned above is utilized for this setting too. The dummy substrate 48 is suction-adhered to the suction pad and lifted up, the small diameter portion 54 of the stepped boss 52 is positioned at the center hole 26 in the disc substrate 12, and the dummy substrate 48 is placed on the disc substrate 12.

Here, when the small diameter portion 54 is fitted in at the center hole 26, the dummy substrate 48 is positioned concentrically with the disc substrate 12 and the turntable 34. Concurrently therewith, the dummy substrate 48 is fixed by suction on the turntable 34, by negative pressure supplied to the suction groove formed in the upper face of the boss 38 of the turntable 34, such that the disc substrate 12 is sandwiched between the dummy substrate 48 and the turntable 34. Hence, the setting surface 50 of the dummy substrate 48 is disposed to oppose the plate surface 58 of the disc substrate 12, and a gap is formed between the plate surface 58 and the setting surface 50.

Next, the adhesive 24 is spin-coated on the plate surface 58 of the disc substrate 12 by rotation of the turntable 34. Here, the disc substrate 12 and the dummy substrate 48, which are fixed to the turntable 34, rotate integrally with the turntable 34 and are rotated at a predetermined rotation speed for a predetermined duration.

As a result, the adhesive 24 is spread to the outer peripheral side (in directions away from the axial center ST) by centrifugal force. Thus, as shown in FIG. 3A, the adhesive 24 expands so as to fill the gap mentioned above, and is applied (coated) to the plate surface 58 of the disc substrate 12. At this time, as shown in FIG. 3B, a gap 59 is provided between the lower face of the stepped boss 52 of the dummy substrate 48 and the upper face of the boss 38 of the turntable 34, and the large diameter portion 56 of the stepped boss 52 abuts against the plate surface 58 of the disc substrate 12 (at an upper edge portion of the center hole 26). Thus, the setting surface 50 is disposed at a predetermined spacing (0.1 mm) with respect to the plate surface 58. Consequently, film thickness of the adhesive 24, which is formed into a thin film in the gap between the plate surface 58 and the setting surface 50, is substantially uniform at 0.1 mm.

When the spin-coating of the adhesive 24 in this manner finishes, the turntable 34 moves at a lower speed of rotation and ultraviolet rays are irradiated onto the disc substrate 12 from above for a predetermined duration (the arrows UV of FIG. 3A). These ultraviolet rays pass through the dummy substrate 48 and reach the adhesive 24 which has been applied to the plate surface 58 of the disc substrate 12. Thus, the adhesive 24 is cured and the cover layer 22 is formed.

A surplus of the adhesive 24 is flown out to the outer peripheral side from between the disc substrate 12 and the dummy substrate 48. This adhesive 24 is blocked by the turntable cover 44, and scattering to the surroundings is prevented. Because this adhesive 24, which adheres to an inner wall face of the turntable cover 44, is not irradiated by the ultraviolet rays and has a high flowability due to pre-curing, this adhesive 24 can be easily removed and recycled.

Then, after the cover layer 22 has been formed, the rotation of the turntable 34 stops, the negative pressure supplied to the suction groove in the upper face of the boss 38 is released and, as shown in FIG. 4, the dummy substrate 48 is detached from the disc substrate 12. Thus, the optical disc 10 shown in FIG. 1 is produced.

As has been described above, in the cover layer formation method of the optical disc 10 relating to the present embodiment, film thickness of the adhesive 24, which is applied to the plate surface 58 of the disc substrate 12 by a spin-coating method, is made uniform with high accuracy by the dummy substrate 48, which is set to the spacing by abutting the large diameter portion 56 of the stepped boss 52 against the plate surface 58 of the disc substrate 12. The cover layer 22 is formed with a high thickness accuracy by curing the adhesive 24 in this state, forming the cover layer 22, and then detaching the dummy substrate 48 from the disc substrate 12.

Further, because the adhesive 24 is applied so as to be formed by the dummy substrate 48, specification of conditions such as viscosity of the adhesive 24, rotation speed of the disc substrate 12 and the like in order to obtain a desired accuracy of thickness can be simplified, and control of the fabrication process can be easy. Thus, the cover layer 22 can be formed to a high thickness-accuracy with ease.

Further still, in the present embodiment, the parting agent is coated, in advance, on the setting surface 50 of the dummy substrate 48 before the dummy substrate 48 is set on the disc substrate 12. Consequently, when the dummy substrate 48 is detached from the disc substrate 12, releasability from the cover layer 22 is good. Accordingly, deformation of the cover layer 22 and the like can be avoided.

Further yet, because the dummy substrate 48 of the present embodiment is formed of a glass material, the dummy substrate 48 can be fabricated easily and at low cost to have high dimensional accuracy and planarity of the setting surface 50, with excellent resistance to deformation.

Second Embodiment

Next, a second embodiment of the present invention will be described. An adhesive coating device relating to the second embodiment is substantially the same as the structure described for the first embodiment above. Accordingly, structural components that are the same are given the same reference numerals, and descriptions thereof are omitted.

Figure 5:
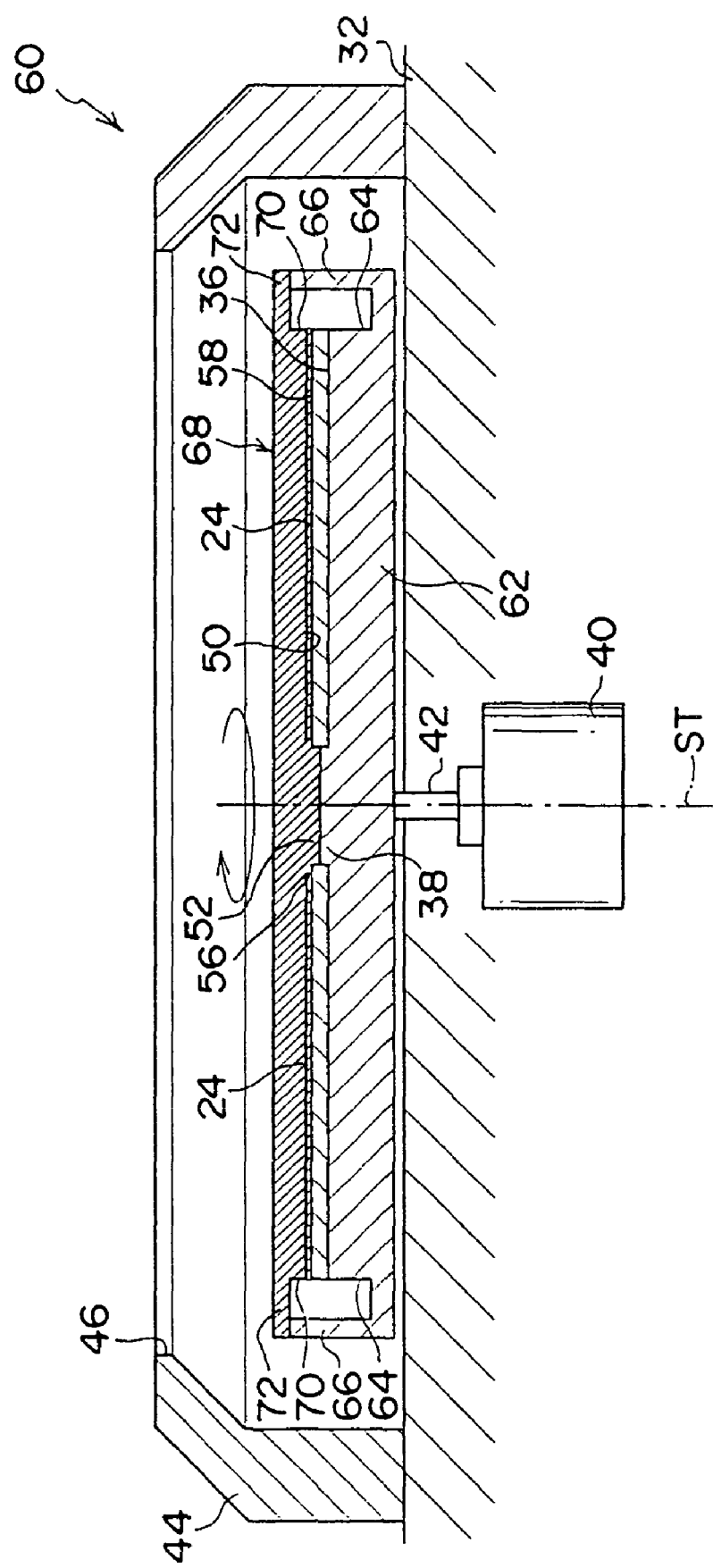
FIG. 5 shows general structure of apparatus of an adhesive coating device relating to a second embodiment of the present invention, and is a sectional elevational view of a state in which a dummy substrate is set on a disc substrate and an adhesive is spin-coated on the disc substrate.

In an adhesive coating device 60 of the second embodiment, which is shown in FIG. 5, three or more receiving ribs 66 are provided along an outer peripheral direction (a circular peripheral direction) at an outer peripheral face 64 of a turntable 62. The receiving ribs 66 stick out with 'L' shapes in cross section from a lower end portion of the outer peripheral face 64. These receiving ribs 66, which are dispersedly disposed, are disposed at uniform intervals in the circular peripheral direction of the turntable 62. It is preferable that these receiving ribs 66 have dispersedly disposed protruding forms but, as an alternative, it is acceptable that a receiving rib is made to have a continuous ring form, or the like.

The stepped boss 52, which is the same as in the first embodiment, is provided at a dummy substrate 68. At an upper end portion of an outer peripheral face 70 of the dummy substrate 68, a flange 72 is formed to correspond with the receiving ribs 66 of the turntable 62. A relative height dimension of the receiving ribs 66 with respect to the placing surface 36 of the turntable 62 and a relative step dimension of a lower face of the flange 72 with respect to the setting surface 50 of the dummy substrate 68 are precisely machined so as to respectively have high dimensional accuracy.

Thus, during spin-coating of adhesive onto the disc substrate 12 by the adhesive coating device 60, the large diameter portion 56 of the stepped boss 52 of the dummy substrate 68 abuts against the upper edge portion of the center hole 26 of the disc substrate 12, at the inner peripheral side of the disc substrate 12, and the flange 72 of the dummy substrate 68 abuts against the receiving ribs 66 of the turntable 62, at the outer peripheral side of the disc substrate 12. Thus, the setting surface 50 is disposed at the predetermined spacing with respect to the plate surface 58. Consequently, the film thickness of the adhesive 24 that is spin-coated is uniform.

In this second embodiment, at an outer side of an adhesive application region of the disc substrate 12, a structure for supporting the dummy substrate 68 is further provided by the receiving ribs 66 of the turntable 62 and the flange 72 of the dummy substrate 68. Thus, surface oscillations during rotation can be prevented, therefore, stability of the dummy substrate 68 during rotation and the like is improved. Furthermore, the flange 72 of the dummy substrate 68 is point-supported by the three or more receiving ribs 66 which are dispersedly disposed, and these receiving ribs 66 are disposed at uniform intervals in the circular peripheral direction of the turntable 62. Therefore, in comparison with a case in which the flange 72 of the dummy substrate 68 is surface-supported by, for example, a ring-like circular rib (a peripheral rib) or the like, errors caused by distortion, warping, swelling and the like of contact surfaces can be eliminated, and coating thickness accuracy of the adhesive 24 can be raised further. Consequently, the cover layer 22 can be formed with an even higher thickness-accuracy.

Hereabove, the present invention has been described in detail by the aforementioned first and second embodiments. However, the present invention is not limited to these, and various other embodiments are possible within the scope of the present invention.

For example, in the first and second embodiments, the spacing of the setting surface 50 with respect to the plate surface 58 is set by abutting the large diameter portion 56 of the stepped boss 52 provided at the dummy substrate 48 (or the dummy substrate 68) against the plate surface 58 of the disc substrate 12. However, it is also possible to set the spacing between the plate surface 58 of the disc substrate 12 and the setting surface 50 of the dummy substrate 48 constant by abutting a lower face of a boss protruding from this dummy substrate 48 against the turntable 34, the upper face of the boss 38 of the turntable 34, or the like (for example, a state in which the gap 59 is not formed in FIG. 3B, and the like). Further, a different rotating body other than the turntable 34 may be utilized at the rotating means for rotating the disc substrate 12.

Further again, in the process of curing the adhesive 24 (the process of forming the cover layer 22) and the process of detaching the dummy substrate 48 that have been described for the first embodiment, the dummy substrate 48 is detached after the adhesive 24 has been completely cured. However, rather than completely curing the adhesive 24 thus, it is possible to, for example, shorten the UV irradiation duration and separate the dummy substrate 48 in a provisional curing (semi-cured) state, and implement proper curing by a separate process.

Further still, the optical disc cover layer formation method of the present invention can also be applied to cases of forming cover layers other than a cover layer (outermost layer) that protects an information recording layer of an optical disc.

Because the optical disc cover layer formation method of the present invention is a process as described above, and an optical disc cover layer formation device has a structure as described above, a cover layer for protecting a surface of a disc substrate can be formed to a high accuracy of thickness by a simple process, and a high quality optical disc is provided.

What is claimed is:

1. An optical disc cover layer formation method comprising the steps of:
    supplying liquid-form photo-curing-type resin to a plate surface of a disc substrate;
    setting a dummy substrate over the plate surface of the disc substrate, the dummy substrate being formed of light-transmissive material and including a facing surface which opposes the plate surface with a predetermined spacing;
    coating the photo-curing-type resin on the plate surface, by rotating the disc substrate with the dummy substrate about an axial line perpendicular to the plate surface to spread the photo-curing-type resin between the plate surface and the facing surface;
    forming the cover layer, by irradiating light of a predetermined wavelength at the photo-curing-type resin through the dummy substrate for curing the photo-curing-type resin; and
    detaching the dummy substrate from the disc substrate,
    wherein the dummy substrate comprises a first spacing setting portion which, when the dummy substrate is set over the plate surface and the photo-curing-type resin is spread and coated on the plate surface, contacts the plate surface at the axial line side relative to a coat-region of the photo-curing-type resin on the plate surface and disposes the facing surface at a position opposing the plate surface with the predetermined spacing, and
    wherein the first spacing setting portion is an extending portion, which is provided at a central portion of the dummy substrate, extending toward the plate surface in a state in which the dummy substrate is set over the plate surface.

2. The optical disc cover layer formation method of claim 1, wherein the dummy substrate comprises a second spacing setting portion which, when the dummy substrate is set over the plate surface and the photo-curing-type resin is spread and coated on the plate surface, contacts a rotating member, which rotates the disc substrate, at an outer side relative to a coat-region of the photo-curing-type resin on the plate surface and disposes the facing surface at a position opposing the plate surface with the predetermined spacing.

3. The optical disc cover layer formation method of claim 1, further comprising the step of, before the step of setting the dummy substrate over the plate surface of the disc substrate, applying a parting agent to the facing surface of the dummy substrate.

4. The optical disc cover layer formation method of claim 2, further comprising the step of, before the step of setting the dummy substrate over the plate surface of the disc substrate, applying a parting agent to the facing surface of the dummy substrate.

5. The optical disc cover layer formation method of claim 1, wherein the dummy substrate is formed of a glass material.

6. The optical disc cover layer formation method of claim 2, wherein the dummy substrate is formed of a glass material.

7. The optical disc cover layer formation method of claim 1, wherein the extending portion comprises a small diameter portion positioned in a tip end of the extending portion and a large diameter portion positioned in a base end of the extending portion, to have a stepped configuration,
    the small diameter portion is inserted into a center hole of the disc substrate and the large diameter portion abuts on the plate surface of the disc substrate in a state in which the dummy substrate is set over the plate surface.

8. The optical disc cover layer formation method of claim 1, wherein the extending portion abuts on a rotating member which rotates the disc substrate in a state in which the dummy substrate is set aver the plate surface.

9. The optical disc cover layer formation method of claim 2, wherein the second spacing setting portion is a flange formed at an outer peripheral face of the dummy substrate.

10. The optical disc cover layer formation method of claim 9, wherein the flange abuts on an extending member, which is formed at an outer peripheral face of the rotating member, extending upwardly.

11. The optical disc cover layer formation method of claim 9, wherein the dummy substrate comprises a first spacing setting portion which, when the dummy substrate is set over the plate surface and the photo-curing-type resin is spread and coated on the plate surface, contacts the plate surface at the axial line side relative to a coat-region of the photo-curing-type resin on the plate surface and disposes the facing surface at a position opposing the plate surface with the predetermined spacing, and a second spacing setting portion which, when the dummy substrate is set over the plate surface and the photo-curing-type resin is spread and coated on the plate surface, contacts a rotating member, which rotates the disc substrate, at an outer side relative to the coat-region of the photo-curing-type resin on the plate surface and disposes the facing surface at the position opposing the plate surface with the predetermined spacing.

12. An optical disc manufacturing method comprising the steps of:
   supplying liquid-form photo-curing-type resin to a plate surface of a disc substrate;
   setting a dummy substrate over the plate surface of the disc substrate, the dummy substrate being formed of light-transmissive material and including a facing surface which opposes the plate surface with a predetermined spacing;
   coating the photo-curing-type resin on the plate surface, by rotating the disc substrate with the dummy substrate about an axial line perpendicular to the plate surface to spread the photo-curing-type resin between the plate surface and the facing surface;
   forming the cover layer, by irradiating light of a predetermined wavelength at the photo-curing-type resin through the dummy substrate for curing the photo-curing-type resin; and
   detaching the dummy substrate from the disc substrate,
   wherein the dummy substrate comprises a first spacing setting portion which, when the dummy substrate is set over the plate surface and the photo-curing-type resin is spread and coated on the plate surface, contacts the plate surface at the axial line side relative to a coat-region of the photo-curing-type resin on the plate surface and disposes the facing surface at a position opposing the plate surface with the predetermined spacing, and
   wherein the first spacing setting portion is an extending portion, which is provided at a central portion of the dummy substrate, extending toward the plate surface in a state in which the dummy substrate is set over the plate surface.

* * * * *